J. CAMPBELL.
NATURAL COLOR CINEMATOGRAPHY.
APPLICATION FILED MAY 5, 1914.
1,278,302.
Patented Sept. 10, 1918.
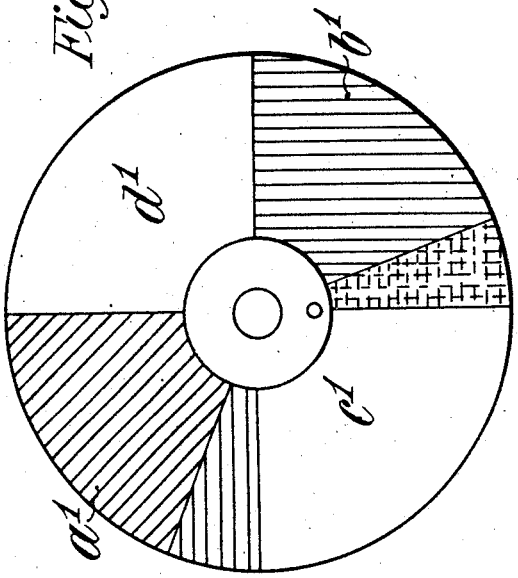
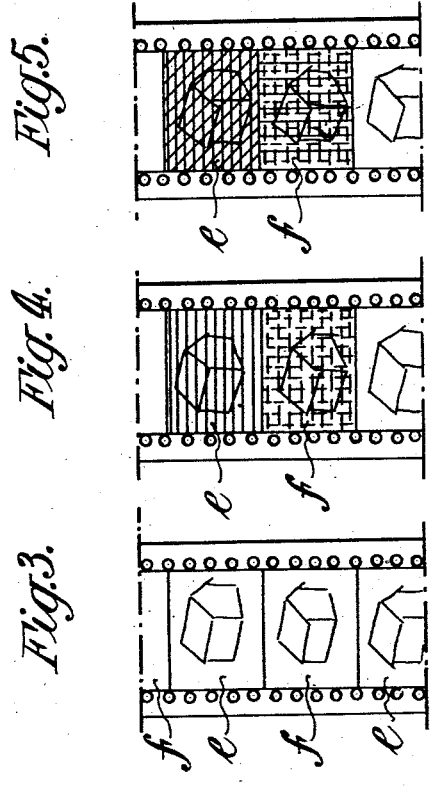
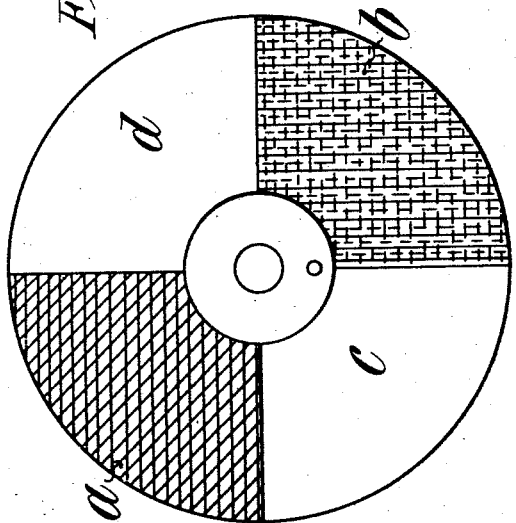
Witnesses
Ira P. Hinds
R. E. Marshall
Inventor
John Campbell
by Connolly Bros
Attorneys

UNITED STATES PATENT OFFICE.

JOHN CAMPBELL, OF MIDDLESBROUGH, ENGLAND.

NATURAL-COLOR CINEMATOGRAPHY.

1,278,302.  Specification of Letters Patent.  Patented Sept. 10, 1918.

Application filed May 5, 1914. Serial No. 836,502.

*To all whom it may concern:*

Be it known that I, JOHN CAMPBELL, a subject of His Majesty the King of England, residing at 30½ Park street, Middlesbrough, in the county of York, Kingdom of England, have invented certain new and useful Improvements in Natural-Color Cinematography, of which the following is a specification.

My invention relates to improvements in color cinematography systems in which the negative film is successively and alternately exposed through rotating color filters, and has for its object the simplification of the process of obtaining correct color value negatives in four colors and the conversion of the black and white positives therefrom into color films ready for projection, such positives after conversion carrying their own gelatin color filters as part of the film, and thus being rendered capable of being projected in ordinary projectors used for ordinary black and white films.

Referring first to negatives, it has been proposed in the specification of British Patent No. 26,671 of 1906 to use alternately records of single color filters with a minimum exposure viz. green and red giving a two color system the positives from which are only capable of being projected in colors by a machine specially fitted with two revolving single color filters quite separate from the film. Also in the specification of my own British Patent No. 15,478 of 1912, I propose the use of specially selected single color filters viz. blue and orange with unequal exposures also giving a two color system, the positives therefrom being capable of being projected in ordinary machines. Further in the specification of my British Patent No. 24,645 of 1911, I propose to use alternate records of tri-color filters each consisting of three graduated colors representing one-half of the spectrum with unequal exposures giving a six color system, the positive therefrom being only capable of being projected in color by a machine specially fitted with two three-color revolving filters.

In the specification of British Patent No. 26,976 of 1912 it has in addition been proposed to use alternating records of two adjacent but separate cold colors and three adjacent but separate warm colors with unequal exposures giving a five color system.

Now according to my present invention I use two filters of bi-color formed of single spectrum colors, one cold of a spectrum blue and a spectrum green and the other warm of spectrum yellow and a spectrum red giving a four color system. A total effect or transmission in the blue and green filter equal to 4100 to 5600, and the warm yellow red filter of 5600 to red end, giving negatives of equal character and density.

The single spectrum colors forming each bi-color filter may be either separate and adjacent, superimposed, or blended.

My invention is hereinafter described with reference to the accompanying drawing in which:—

Figure 1 is a view of one form of the camera light filter and shutter;

Fig. 2 is a view of another form of negative shutter, and

Figs. 3, 4 and 5 are detail views, Fig. 3 showing the black and white positive base printed from the negative, Fig. 4 the black and white base with the first color on each positive, and Fig. 5 the black and white base with the two colors added, each positive picture thus carrying a bi-color gelatin filter.

I form the blended bi-color filters *a b* Fig. 1, by preparing two gelatin filters one blue and one green of suitable transmission and transparency in the usual manner, and superimposing them one on the other so that the total transmission value is as above forming the filter *a*, and similarly preparing two gelatin filters one yellow and one red of suitable transparency and transmission, and superimposing them one on the other so that the total transmission value is equal to that given above, forming the filter *b*.

Alternatively I may blend the two suitable colors by means of spraying them from suitable apparatus such as atomizers on to a transparent film of gelatin or other suitable material, the proportion of each color being governed so as to give, in the aggregate in the finished filter, the effect of a transmission value as given. The correct proportion of each color may be easily and conveniently applied by regulation of the atomizers as to size, strength of blast, and length of time in action. I may use two atomizers consecutively or simultaneously as convenient.

Or, I may dissolve the colors in suitable media for example water, alcohol, and gelatin (5 to 10%) to the proper strength and blend in the proper proportions and then prepare by imbibition a gelatin filter from the blended colors so as to give the effect of a total transmission value as given. In the screen illustrated in Fig. 2 I place the two colors separately but adjacent. In $a'$ the cold filter is formed of a suitable spectrum blue and green, the area and depth of each being so proportioned as to give a transmission in its total effect of that previously given and in $b'$ I similarly use a yellow and red giving a transmission of a total effect of that previously given. By either method the transmission required is verified by any of the usual methods, the depth of color being just sufficient to prevent white light from passing.

These filters of the given transmission are set in suitable holders in the usual way and fixed as shown in a shutter each occupying 90° of the circumference and separated by opaque masking portions $c$ and $d$ also of 90° each. The negative film is thus equally exposed alternately to blue and green and yellow and red of the given transmissions and negatives of equal character are obtained with equal exposures.

The shutter is set and geared so as to make one revolution for every two negatives taken, each two color filter $a$, $a'$ and $b$, $b'$ screening a successive negative and the opaque portions $c$, $c'$ and $d$ $d'$ masking the change of negative area. By this invention I therefore obtain negatives of equal color value, viz. a two color negative of blue and green and a two color negative of yellow and red, under equal exposures which allows the use of the ordinary film movement.

From the negative I print and develop a positive in the ordinary way and convert the black and white positive into a positive base carrying bi-color filters of two blended spectrum colors which differ from those used in the camera, in that they have more blue and less yellow in their transmissions and are so balanced in color that the total light effect from the cold filter is complementary to the total light effect from the warm filter.

According to my invention these filters form part of the actual film and consists of the gelatin surface of each picture, converted into a bi-color screen and I find in practice that the total effect of a transmission of 4300 to 5500 in the blue and green filter and a transmission of 5900 to 7100 in the yellow and red filter will give complementary conditions.

In the case of the positives I first dissolve each color in a suitable media like water and alcohol to the proper depth of color and then dissolve a little gelatin in the solution. From 5 to 10 per cent. of gelatin gives good results. These colors are then superimposed on the gelatin surface of the film which by imbibition and adhesion take up the color and are thus converted into color filters. The positive films therefore carry their own gelatin color filters.

By a preferred method I first color the alternate pictures $e$ shown in Fig. 3 and which are printed from the negative pictures exposed through the blue and green screen with a blue color of suitable transmission and depth as depicted in Fig. 4, and when dry I then superimpose over the blue a green as shown in Fig. 5, of suitable transmission and depth. In a similar manner I first color the other alternate positive pictures $f$ printed from the negative pictures exposed through the yellow and red screen with a yellow color of suitable transmission, and depth as shown in Fig. 3, and when dry I superimpose over the yellow, a red of suitable transmission and depth as in Fig. 4. The total transmission in both cases is that previously stated, and verified by any of the usual methods. This finished picture film may now be projected in an ordinary machine without the use of revolving or stationary color screens attached to the projector.

The film may be colored in the manner indicated either by hand or machine by means of a brush or brushes charged with the color, and moving across the film or by atomizers or nebulizers used either consecutively or simultaneously or by successive treatment in color baths through stencils the alternate pictures being suitably protected by parts of the stencils while the exposed ones are being treated.

Alternatively I may blend the two colors in the proper proportions before applying them to the film, making the formation of the gelatin color filter by the use of brushes, nebulizers or stencils a single operation as shown in Fig. 5.

I thus convert each developed black and white positive base gelatin picture into a gelatin color filter of two colors, while still retaining the original black and white image, and when a succession of such pictures are run through an ordinary projector in proper sequence with sufficient speed, pictures in colors are obtained without the attachment of color screens, stationary or revolving, to the projector, which approximate very closely to the natural tints.

Though I have described my invention with reference to blue, green, yellow and red it is obviously applicable to the use or selection of any four single spectrum colors in which a blended group of two in projection is complementary to the blended group of the other two.

What I claim as my invention and desire to secure by Letters Patent of the United States is:—

1. A positive cinematograph film composed of a series of pictures representing and produced from negatives taken respectively through bi-colored filters, each of which is composed of a plurality of colors which, blended, form one composite color, each positive picture carrying its own gelatin bi-colored filter, as part of the film, said bi-colored filters of the positive film being composed respectively of two cold colors equaling single spectrum colors and two warm colors equaling single spectrum colors, said colors of each bi-colored filter of the positive film being blended so as to form one composite color in each case.

2. A positive cinematograph film composed of a series of pictures representing and produced from negatives taken, respectively, through bi-colored filters, each of which is composed of two colors which, blended, form one composite color, each positive picture carrying its own gelatin bi-colored filter, as part of the film, said bi-colored filters of the positive film being composed respectively of two cold colors equaling single spectrum colors and two warm colors equaling single spectrum colors, said colors of each bi-colored filter of the positive film being blended so as to form one composite color in each case, the cold colors and warm colors being so balanced that the total light effect from the cold color filter is complementary to the total light effect from the warm color filter.

3. A cinematograph positive film, having thereon a plurality of positive pictures, each picture being recorded from a negative obtained through a bi-colored filter section and colored by a composite color formed by the superimposition on the positive film of the two individual colors of the bi-color filter.

4. A cinematograph positive film bearing thereon a plurality of positive pictures, each picture being recorded from a negative obtained through a bi-color filter section and colored by a composite color formed by the superimposition on the positive film of the two individual colors of the bi-colored section, said bi-colors being composed respectively of two cold colors equaling single spectrum colors and two warm colors equaling single spectrum colors, said colors being blended so as to form one composite color.

5. A cinematograph positive film bearing a plurality of positive pictures thereon, each picture being colored by superimposition by a composite color having as its components the individual colors of a bi-color filter section through which the corresponding negative was recorded and retaining the color values of the original black and white corresponding negative unimpaired, said bi-colors being composed respectively of two cold colors equaling single spectrum colors and two warm colors equaling single spectrum colors, said colors being blended so as to form one composite color, the cold colors and the warm colors being so balanced that the total light effect from the cold color filter is complementary to the total light effect from the warm color filter.

In testimony whereof I have signed this specification in the presence of two subscribing witnesses.

JOHN CAMPBELL.

Witnesses:
    J. S. WITHERS,
    C. S. WITHERS,